United States Patent [19]

O'Neill, Jr.

[11] 3,911,403

[45] Oct. 7, 1975

[54] DATA STORAGE AND PROCESSING APPARATUS

[75] Inventor: Joseph L. O'Neill, Jr., Haddonfield, N.J.

[73] Assignee: GTE Information Systems Incorporated, Stamford, Conn.

[22] Filed: Sept. 3, 1974

[21] Appl. No.: 502,984

[52] U.S. Cl. .............................................. 340/172.5
[51] Int. Cl.$^{2}$ ...................... G06F 3/14; G06F 13/06
[58] Field of Search ...................... 340/172.5; 445/1

[56] References Cited

UNITED STATES PATENTS

| | | | |
|---|---|---|---|
| 3,297,994 | 1/1967 | Klein | 340/172.5 |
| 3,501,746 | 3/1970 | Vosbury | 340/172.5 |
| 3,510,843 | 5/1970 | Bennett et al. | 340/172.5 |
| 3,525,079 | 8/1970 | Cuccio | 340/172.5 |
| 3,541,516 | 11/1970 | Senzig | 340/172.5 |
| 3,566,358 | 2/1971 | Hasbrouck | 340/172.5 |
| 3,585,600 | 6/1971 | Saltini | 340/172.5 |
| 3,599,186 | 8/1971 | May et al. | 340/172.5 |
| 3,685,020 | 8/1972 | Meade | 340/172.5 |
| 3,693,165 | 9/1972 | Reiley et al. | 340/172.5 |
| 3,716,838 | 2/1973 | Beard | 340/172.5 |

*Primary Examiner*—Raulfe B. Zache
*Assistant Examiner*—Jan E. Rhoads
*Attorney, Agent, or Firm*—Peter Xiarhos; Elmer J. Nealon; Norman J. O'Malley

[57] ABSTRACT

Data storage and processing apparatus for storing and processing data for use by a video display monitor. The data storage and processing apparatus includes a random access memory having a general storage section and a plurality of adjacent control storage sections. The general storage section is arranged to store data including display character data to be displayed on the display surface of a video display monitor. The control storage sections are arranged to store data, in the form of tables, for controlling the readout of data from the general storage section of the random access memory. Each of the tables includes start address information specifying the address of the first data character to be read out from the general storage section of the random access memory, window size information specifying the number of lines of a block of data to be read out from the general storage section to be displayed on a video display monitor, cursor information specifying the cursor location on the video display monitor where the first character of a block of data read from the general storage section is to be displayed, and control information for specifying a particular type of cursor and also for specifying a variety of control function. The tables are read out of the random access memory in succession and, after each table has been read out, the block of data in the general storage section specified by the table is read out and applied to output processing circuitry for processing thereby.

10 Claims, 5 Drawing Figures

DATA STORAGE AND PROCESSING APPARATUS

BACKGROUND OF THE INVENTION

The present invention relates to data storage and processing apparatus and, more particularly, to data storage and processing apparatus for storing and processing data for use by a video display monitor in systems such as stock quotation systems.

There are many display applications in which it is desired to display information on the display surface of a video display monitor. For example, in stock quotation systems it is often desired to display several blocks of security and commodity information, either individually or several blocks simultaneously, on the display surface of a video display monitor located in a stockbroker's office. Some examples of blocks of security and commodity information include information relating to a particular security (e.g., open, close and last trades, high, low, dividends, etc.), quote board formatted information relating to a selected number of securities and/or commodities, market indices including Dow Jones, Standard & Poor, NYSE and ASE indices, and listings of price-active or volume-active securities. Desirably, the above blocks of information should be stored simultaneously in a memory storage unit and read out therefrom as required to be then processed, for example, in recirculating data registers and character generator circuitry, into a form suitable for display on the display surface of the video display monitor. Additionally, the conservation of storage space in the memory storage unit is highly desirable so as to maximize the amount of data which may be stored in the memory storage unit at any given time.

BRIEF SUMMARY OF THE INVENTION

In accordance with the present invention, a data storage and processing apparatus is provided including a storage means having a first section and a plurality of second sections. The first section of the storage means contains data characters at predetermined successive storage locations therein specified by corresponding addresses and the plurality of second sections each contain a table of information. Each of the tables of information includes start address information specifying the address of the storage location of a particular data character in the first storage section of the storage means and block size information specifying a particular size of a block of data characters, commencing with the data character at the storage location specified by the start address information, to be read out from the first section of the storage means.

The data storage and processing apparatus of the invention further includes a first means coupled to the storage means and operative to cause a table of information contained in a second section of the storage means to be read out therefrom and to be applied to an output of the storage means. A second means coupled to the storage means operates after the aforesaid table of information has been read out from its second section of the storage means to receive the start address information of the table of information and operates in response to the start address information to cause the storage means to read out to its output data characters from the first section thereof commencing with the data character at the storage location in the first section specified by the start address information. A third means coupled to the output of the storage means operates after the aforesaid table of information has been read out from its second section of the storage means to receive the block size information of the table of information and operates after a period of time related to the size of the block of data characters specified by the block size information to cause the second means to discontinue the readout from the first section of the storage means of the data characters following the initial data character read out from the storage means in the locaation in the first section specified by the start address information of the table of information.

BRIEF DESCRIPTION OF THE DRAWING

Various objects, features and advantages of a data storage and processing apparatus in accordance with the present invention will be apparent from the following detailed discussion taken in conjunction with the following drawing in which.

DETAILED DESCRIPTION OF THE INVENTION

Figure 1:
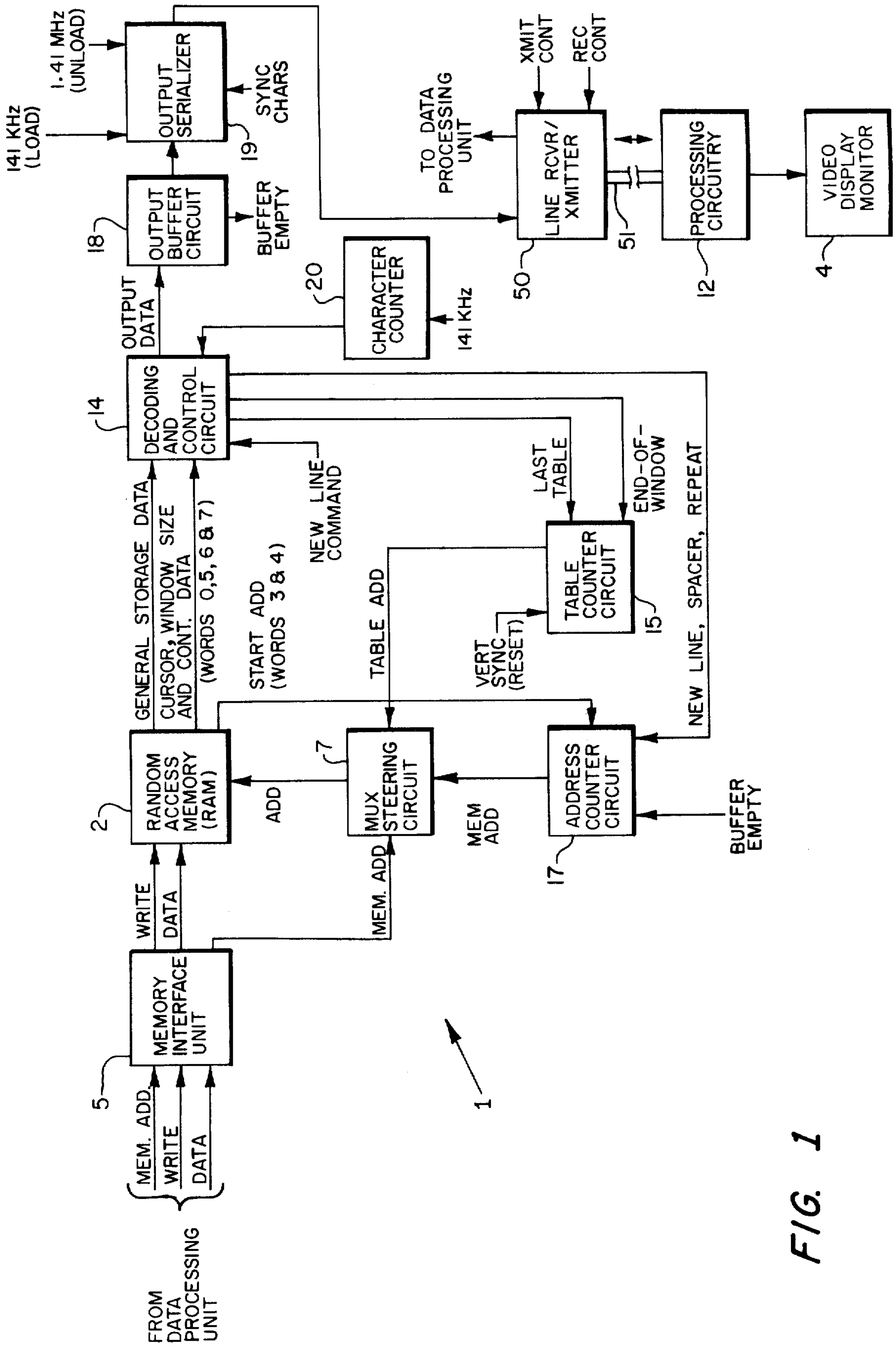
FIG. 1 is a schematic block diagram of a data storage and processing apparatus in accordance with the present invention.

Referring now to FIG. 1, there is shown a data storage and processing apparatus 1 in accordance with the present invention. The data storage and processing apparatus 1 includes a random access memory (RAM) 2. In general, this memory is arranged to store data including coded display character data to be processed for display on the display surface of a video display monitor 4, coded control data for use in connection with the display data and also for conserving storage space in the random access memory 2, and other data, in the form of tables, for selectively controlling the readout of the aforesaid display and control data from the random access memory 2. The above data is received from and caused to be written into and stored in the random access memory 2 by means of a memory interface unit 5 which receives, from any suitable input data source (e.g., a processor), the necessary information for writing and updating data in the memory 2. This information includes memory address signals specifying storage addresses, or locations, where data is to be written into the memory 2, write signals specifying write operations, and the data, in the form of coded 8-bit characters, or words, to be written into and stored in the memory 2.

The memory interface unit 5, which typically includes conventional circuitry such as gates and shift register circuitry for establishing a timed writing cycle, operates in response to each memory address signal and an accompanying write signal and coded 8-bit word or character (either a display data character, control character or table character) to couple the write signal and the coded 8-bit character to respective write and data inputs of the random access memory 2 and to couple the memory address signal to a multiplexer steering circuit 7. The multiplexer steering circuit 7, which typically contains an arrangement of multiplexers for steering address signals presented at different inputs thereof to the memory 2, operates to steer the memory address signal received thereby to an address input of the memory 2. This address signal, together with the write signal applied to the write input of the memory 2, causes the memory 2 to write the aforesaid accompanying 8-bit character at the address specified by the memory address signal. The abovedescribed random access memory 2 may be implemented by memory devices of any suitable form. For example, the memory 2 may be implemented by MOS devices manufactured and sold by the Mostek Corporation under the trade designation MK4102P-1. A typical storage capacity for the memory 2 is 2048 8-bit words. This capacity may be readily expanded, as desired, by the use of additional memory devices.

Figure 2:
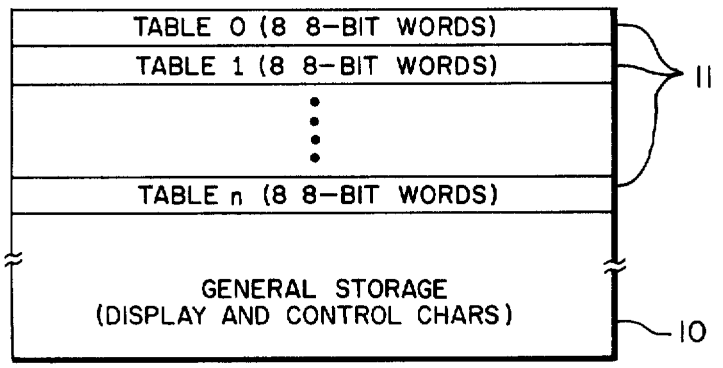
FIG. 2 is a schematic representation of data as stored in a random accoss memory employed in the data storage and processing apparatus of FIG. 1.

The general arrangement of data as stored in the random access memory 2 and utilized by the invention is shown in FIG. 2. As indicated in FIG. 2, the random access memory 2 includes a general storage section 10 and a plurality (e.g., up to 16) of adjacent control storage sections 11. The general storage section 10 is employed to store coded display data characters, as intended to be displayed, in a selective fashion, on the display surface of the video display monitor 4, and coded control characters for use in connection with the display characters and also for conserving storage space in the memory 2. The coded control characters used in connection with the display data characters include coded attribute characters for establishing certain display attributes or characteristics for the data characters displayed on the display surface of the video display monitor 4. By way of example, these display attributes may include the underlining and/or intensifying of selected characters displayed on the display surface of the video display monitor 4 and/or the doubling of the width of selected characters displayed on the display surface of the video display monitor 4. The attribute characters are ultimately processed by processing circuitry 12, used in conjunction with the video display surface of the video display monitor 4. The aforementioned coded attribute characters and the processing circuitry 12 are described in detail in U.S. Pat. No. 3,895,374 (issued July 15, 1975), No. 3,895,375 (issued same date), and No. 3,896,428 (issued July 22, 1975), all by inventor Robert C. Williams. For specific details as to the nature and use of the coded attribute characters and the processing cicuitry 12, reference may be made to the aforementioned application.

The coded control data characters used for memory conservation purposes include coded new line characters, coded spacer characters and coded three-character repeat sequences. In general, each of these coded characters and sequences eliminates the need for storing a larger number of characters in the random access memory 2 whereby storage space is conserved in the memory 2. For example, each coded new line character as employed in the present invention represents the beginning of a new display line on the display surface of the video display monitor 4 and is preceded in the memory 2 by coded display data characters for the immediately preceding display line and followed by the coded display data characters for the new display line. A coded new line character is employed principally by the invention in storing characters in the memory 2 for a display line having a length less than the maximum possible length (e.g., 80 characters). In this case, rather than using several space characters in the memory 2 to fill out the line to the maximum possible length, a single coded new line character is used instead to replace these several space characters.

Each coded spacer character as employed in the present invention specifies that a spacing operation is to take place and, additionally, specifies a particular number of times that spaces are to be provided consecutively in a line of display data. Thus, if it is desired to provide a fixed number of consecutive spaces in any given display line, this number is simply specified in a coded spacer character. As a consequence, it is required only to store a single coded spacer character rather than several coded space characters in the memory 2.

Each coded three-character repeat sequence as employed in the present invention specifies that a repeat operation is to take place (specified by the coded first character of the sequence) and, in addition, a number of times that a particular display character is to be repeated consecutively in a given display line (specified by the coded second character of the sequence) and the particular display character to be repeated (specified by the coded third character of the sequence). Thus, if it is desired to provide a fixed number of consecutive identical display characters in any given display line, this number and the display character to be repeated are simply specified in a coded three-character repeat sequence. It is therefore unnecessary to store a display character in several consecutive storage locations in the memory 2.

In addition to the abovedescribed coded control data stored in the general storage section 10 of the random access memory 2, other coded control data may be written into and stored in the memory 2. For example, if it is desired to provide certain control functions at the video display monitor 4, such as illuminating a light or "beeping" a speaker of an associated keyboard, or if other equipment is to be used in conjunction with the video display monitor 4, such as a light pen, badge reader or a copy printer, appropriate coded control data, including required coded address information, is caused to be written into and stored in the memory 2. These aspects are also described in the aforementioned co-pending application of Williams.

Referring again to FIG. 2, the aforementioned plurality of control storage sections 11 of the random access memory 2 are used to store a corresponding plurality of table O–*n* each of which is used to control the readout of a selected block of data (display and control characters) from the general storage section 10 of memory 2. This block of data is then processed by subsequent circuitry to provide a block of display data (e.g., a listing of market indices as requested by a stockbroker) on the display surface of the video display monitor 4. Although the purpose and use of the tables O–*n* will be described in detail hereinafter, it is believed that a brief description of a typical table will be helpful at this juncture. A typical arrangement of the data contained in a table is shown in FIG. 3.

Figures 3, 5:
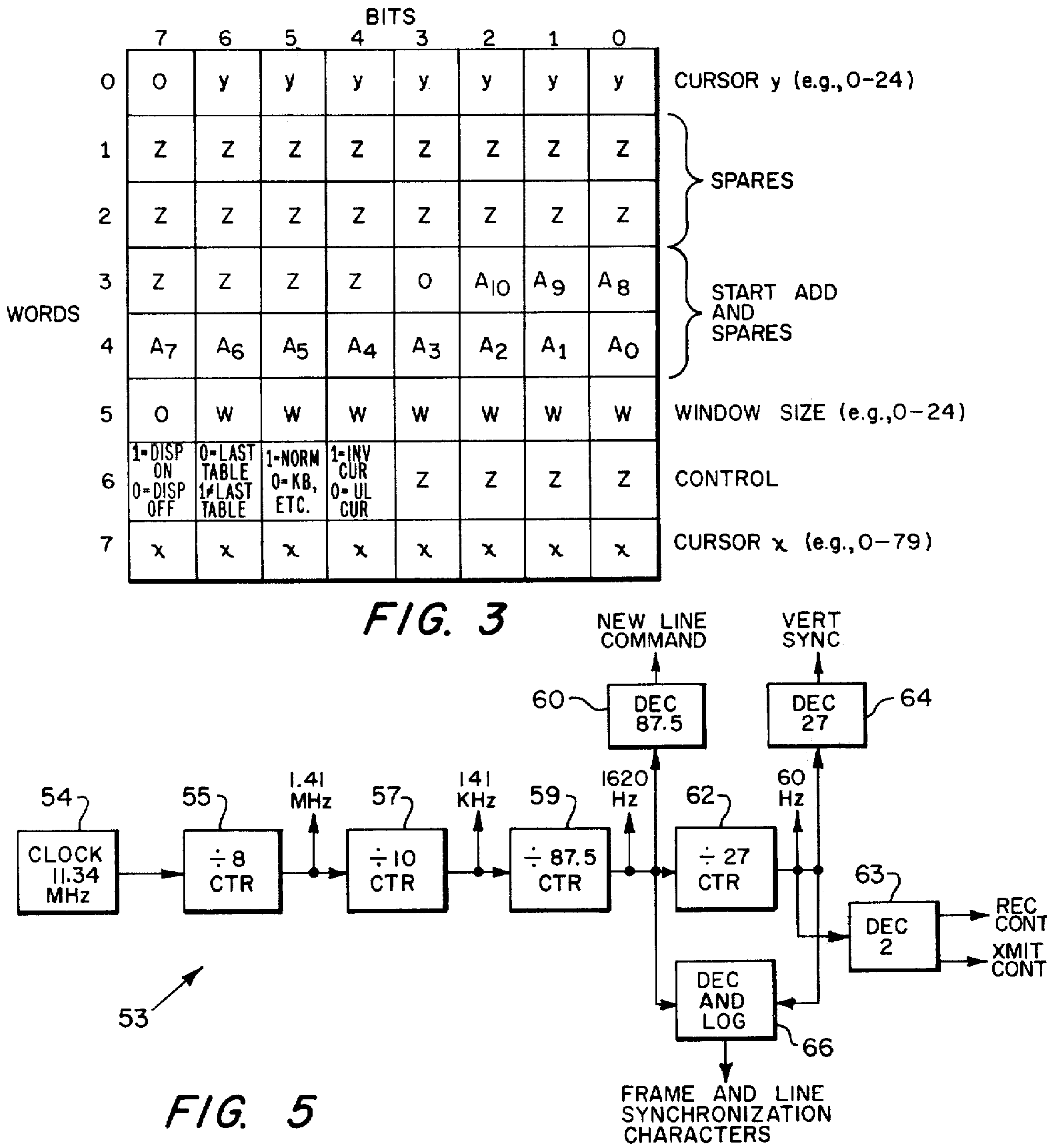
FIG. 3 is a schematic representation of the formatting of data in a table as stored in the random access memory.
FIG. 5 is a schematic block diagram of timing and control circuitry for producing timing and control signals for use by the data storage and processing apparatus of FIG. 1.

As shown in FIG. 3, the table comprises eight 8-bit characters or words 0–7. The first word of this table, namely, word O, is used to represent the *Y* address of a cursor as employed to position a block of data read out of the general storage section 10 of the memory 2 on the display surface of the video display monitor 4. Bit 7 of this word is made a 0 and the remaining bits, designated *y* in FIG. 3, are selected to have 0 or 1 values to represent the number of a particular horizontal display line, or row of characters, of the display surface of the video display monitor 4 in which the cursor is to be positioned. By way of example, for a video display monitor having 25 display lines, the cursor *y* bits are selected to represent a number from 0 to 24.

Words 1 and 2 of the table of FIG. 3 are used as spare words and are reserved for future use. These words contain bits 0–7, designated Z in FIG. 3, each of which, when utilized, may have a binary value of 0 or 1.

Words 3 and 4 of the table of FIG. 3 are used to represent a memory start address at which the first character of data is to be read out from the general storage section 10 of the random access memory 2. The memory start address is represented by eleven bits, designated $A_0 - A_{10}$, each of which may have a binary value of 0 or 1. Bits 4–7 of word 3, designated Z, represent spare bits, each of which, when utilized, may have a binary value of 0 or 1, and bit 3 is made to have a binary value of 0.

Word 5 of the table of FIG. 3 is a "window size" word and is used to represent a particular number of lines, commencing with the memory start address specified by words 3 and 4, to be read out of the general storage section 10 of the memory 2 for purposes of display on the display surface of the video display monitor 4. Bit 7 of this word is made to have a binary value of 0 and each of the remaining bits 0–6 of this word, designated W, is selected to have a binary value of 0 or 1. By way of example, for the aforementioned example of a 25-line video display monitor, the bits W of word 5 are selected to represent a number from 0 to 24.

Word 6 of the table of FIG. 3 is used to represent control data for achieving certain control functions. Specifically, bit 7 of this word is used to specify whether the data to be read out of the general storage section 10 of the memory 2 is to be actually displayed on the display surface of the video display monitor 4 or is to be concealed from the viewer. For example, if the stockbroker is whose office the video display monitor 4 has been placed has subscribed to receive, and has requested, the particular block of display data specified by the table under discussion, (for example, a listing of stock market indices), bit 7 of word 6 is made to have a binary value of 1. If the stockbroker has not subscribed to receive, or has not requested, this display data, the display data is concealed from him and, for this purpose, bit 7 of word 6 is made to have a binary value of 0.

Bit 6 of word 6 is used to indicate whether the particular table under discussion is or is not the last table stored in the memory 2, it being recalled that several (*n*) tables may be provided in the memory 2. If it is the last table, bit 6 of this word is made to have a binary value of 0. If it is not the last table, bit 6 is made to have a binary value of 1. The purpose of this bit will be readily apparent hereinafter.

Bit 5 of word 6 is used for purposes of allowing communication, if desired or necessary, between devices associated with the video diisplay monitor 4 (such as a keyboard, lightpen, badge reader or copy printer), and external data processing apparatus (e.g., a processor). Whenever such communication is to take place, during which time data is not to be displayed on the display surface of the video display monitor 4, bit 5 of word 6 is made to have a binary value of 0. Otherwise, bit 5 is made to have a binary value of 1. This aspect of the operation of the apparatus of the invention is also described in the aforementioned co-pending application of Williams.

Bit 4 of word 6 is used to specify the type of cursor to be used on the display surface of the video display monitor 4. For example, for an inverter type cursor (i.e., the cursor is an inverted character), bit 4 of word 6 is made to have a binary value of 1, and for an underline type cursor bit 4 is made to have a binary value of 0. Bits 0–3 of word 6, designated Z, are spare bits and are reserved for future control functions. Each of bits 0–3, when used, may have a binary value of 0 or 1.

Word 7 of the table of FIG. 3 is used to represent the *x* address of the cursor as employed on the display surface of the video display monitor 4. Bits 0–7 of this word, designated *x* in FIG. 3, are selected to have 0 or 1 values to represent the number of a particular display character location, or character space, on the display surface of the video display monitor 4 in which the cursor is to be positioned. By way of example, for an 80-character display line or character row (excluding horizontal retrace) for the video display monitor 4, the cursor *x* bits are selected to represent a number from 0 to 79.

The tables 0–*n*, as stored in the random access memory 2, are read out of the memory 2 in succession. After a table has been read out of the memory 2, the appropriate data stored in the general storage section 10 of the memory, as specified by the start address and window size information in the table, is caused to be read out from the general storage section 10 of the memory 2. The tables 0–*n* are caused to be read out from the memory 2 by means of a table counter circuit 15, the multiplexer steering circuit 7 and a decoding and control circuit 14. The table counter circuit 15 is capable of counting in binary fashion up to the number of tables in the memory 2 and receives vertical sync signals from any suitable source, for example, from a timing and control circuit 53 such as shown in FIG. 5, at a typical rate of 60 hertz (the frame rate of the video display monitor 4). The table counter circuit 15 is caused to be reset to a count of 0 by each vertical sync signal. At each resetting of the table counter circuit 15, a zero binary address signal, typically comprising seven bits, is produced by the table counter circuit 15 and applied to the multiplexer steering circuit. This zero address signal is steered by the multiplexer steering circuit 7 to the address input of the random access memory 2. The memory 2 operates in response to the zero address signal at its address input to read out therefrom the first table 0 form the corresponding control storage section 11. Words 3 and 4 of this table, containing the start address representing the address in the memory 2 of the first character of a block of characters to be read out from the general storage section 10 of the memory 2, are applied to an address counter circuit 17. Words 0,5,6 and 7, representing cursor *y*, window size, control and cursor *x* words, respectively, are applied to the decoding and control circuit 14.

The address counter circuit 17, which is capable of counting up to the number of storage addresses, or locations, in the memory 2 (e.g., 2048), operates to store the start address, (words 3 and 4) received thereby and also to apply the start address to the multiplexer steering circuit 7. The start address, comprising eleven bits, is steered by the multiplexing steering circuit 7 to the address input of the random access memory 2. The memory 2 operates in response to the start address to read out of the general storage section 10 the 8-bit character stored therein at the location specified by the start address. This character, in a parallel bit format, is applied to the decoding and control circuit 14 and, assuming that bit 7 of word 6 is a "1", the significance of which will be described in detail hereinafter, this character is applied to a single-character output buffer circuit 18 and then to an output serializer 19. When the output buffer circuit 18 is empty of this character, as indicated by a buffer empty signal produced thereby, the address counter circuit 17 is incremented by the buffer empty signal to the next count representing the address in the memory 2 of the next 8-bit character to be read out of the memory 2. This next character is read out from the memory 2 and applied to the decoding and control circuit 14. The above action continues until the number of lines of characters specified by the window size word 5 of table 0 have been extracted from the memory 2 and applied to the decoding and control circuit 14. As before, buffer empty signals are used to increment the address counter circuit 17 to initiate the readout of the characters following the initial character.

When the last character for table 0 has been read out of the general storage section 10 of the memory 2, the decoding and control circuit 14, which earlier received the window size word 5 of table 0, operates to produce and apply an end-of-window signal to the table counter circuit 15. This signal causes the table counter circuit 15 to be incremented by one to a count representing the address of the next table, that is, table 1, in the memory 2. This address, as in the case of the zero address for table 0, is applied to the multiplexer steering cirucit 7 and is steered thereby to the address input of the memory 2. The memory 2, as before, operates in response to the address received at its address input to read out table 1 from the associated control storage section 11, and to apply words 0, 5, 6, and 7 of this table to the decoding and control circuit 14 and words 3 and 4 to the address counter circuit 17. In the same manner as before, the data in the general storage section 10, as specified by the start address and window size word in table 1, is caused to be read out from the general storage section 10 and to be applied to the decoding and control circuit 14. The remaining tables 2–*n* and the appropriate data stored in the general storage section 10 and specified by these tables are caused to be read out from the memory 2 and to be applied selectively to the decoding and control circuit 14 and to the address counter circuit 17, in the same manner as described above.

When the last table (table *n*) has been read out from the memory 2, aand processed, the decoding and control circuit 14, which earlier received control word 6 of this table containing a 0 bit 6 (representing the last table), operates to produce and apply a last table output signal to the table counter circuit 15. This signal prevents the table counter circuit 15 from being incremented and thereby prevents the table counter circuit 15 from causing the readout from the memory 2 of further information which might be construed by the apparatus of the invention as additional table information.

The decoding and control circuit 14, in addition to producing the aforementioned end-of-window and last table signals, also produces output signals resulting from the processing therein of the aforementioned memory conservation characters, that is, coded new line characters, coded spacer characters and coded three-character repeat sequences. Each of these output signals is applied to the address counter ciruict 17 and inhibits the address counter circuit 17 from incrementing to its next count whereby the further readout of characters from the general storage section 10 of the memory 2 is prevented. The purpose of the inhibiting of the address counter circuit 17 will be described in detail hereinafter in connection with a discussion of a preferred implementation, shown in FIG. 4, of the decoding and control circuit 14.

The decoding and control circuit 14 also receives output signals from a character counter 20 and new line command signals. The character counter 20 is arranged to count up to the maximum possible number of displayable characters in a display line of the video display monitor 4, for example, up to 80 characters, and is clocked by clock signals at the character line rate, typically, 141 Khz. The 141 Khz clock signals may be derived from any suitable source, for example, from the aforementioned timing and control circuit 53 shown in FIG. 5. Each output signal produced by the character counter 20, at the count of 80, occurs at the end of a display line of the video display monitor 4, that is, after 80 characters have been displayed on display line. Each of the aformentioned new line command signals occurs at the beginning of a display line of the video display monitor 4, following horizontal retrace for the preceding display line. A typical rate for the new line command signals is 1620 hertz and may be produced by any suitable means, for example, by the aforementioned timing and control circuit 53 of FIG. 5.

Figure 4:
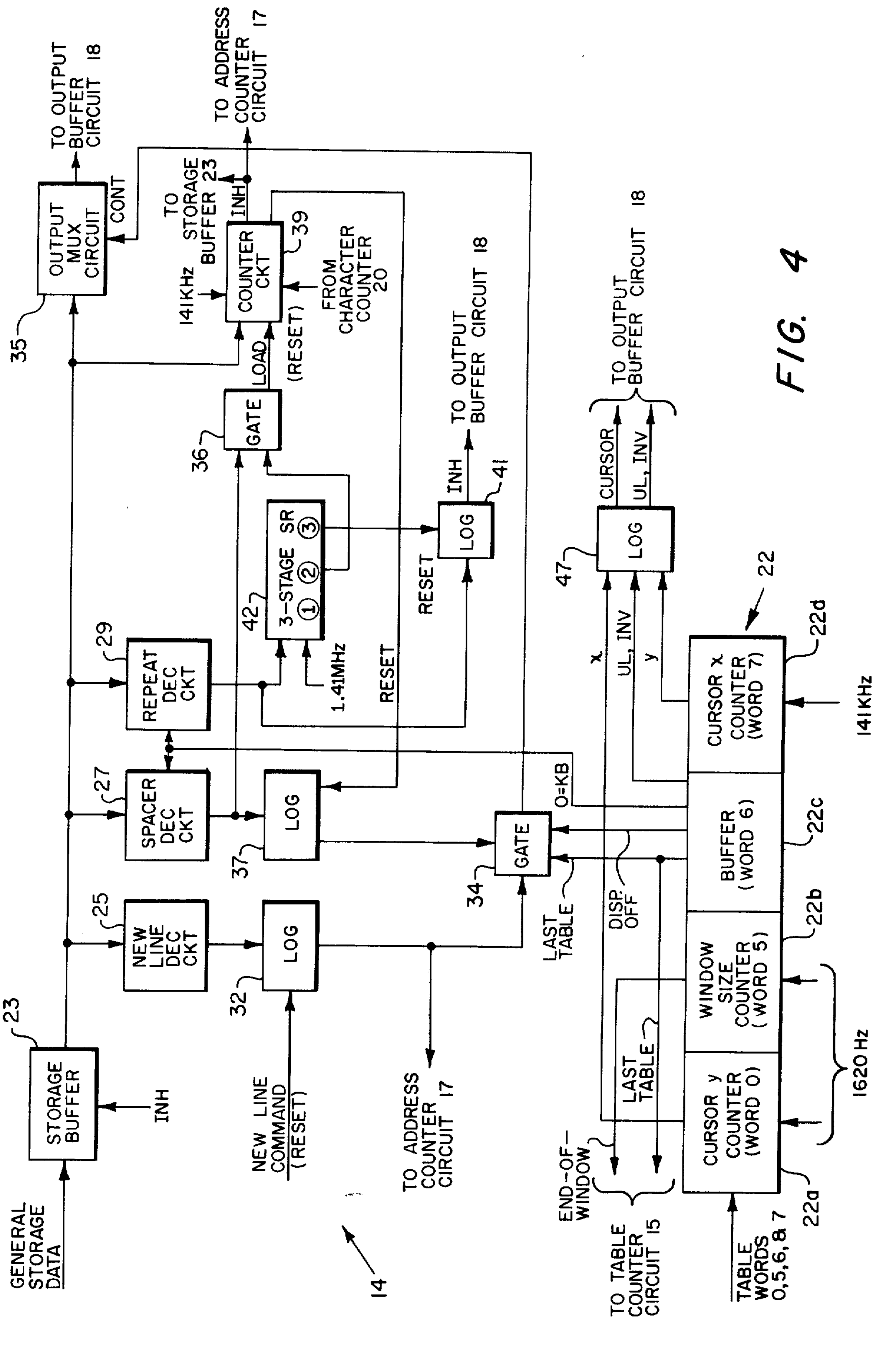
FIG. 4 is a schematic block diagram of decoding and control circuitry employed in the data storage and processing apparatus of FIG. 1.

Referring now to FIG. 4, there is shown a suitable and preferred implementation of the decoding and control circuit 14 employed by the invention. The decoding and control circuit 14 includes a storage arrangement 22 and a storage buffer 23. The storage arrangement 22 is employed to store words 0, 5, 6, and 7 of each table read out from the memory 2 and, for this purpose, includes a binary counter 22*a* for storing word 0 (cursor *y* word), a binary counter 22*b* for storing word 5 (window size word), a buffer 22*c* for storing word 6 (control word) and a binary counter 22*d* for storing word 7 (cursor *x* word). The counters 22*a* and 22*b* are both clocked at the character line rate, 1620 hertz, and the counter 22*d* is clocked at the character rate, 141 Khz, for reasons to be apparent hereinafter.

The aforementioned storage buffer 23 is arranged to receive and store, one character at a time, the data (display and control characters) read out from the general storage section 10 of the random access memory 2 to be processed for display on the video display monitor 4. As each character is applied to the storage buffer 23, it is examined by decoding circuity to determine whether it is a coded new line character, a coded spacer character or the coded first character (repeat character) of a three-character repeat sequence. Specifically, a new line decoder circuit 25 is provided to decode each coded new line character, a spacer decoder circuit 27 is provided to decode each coded spacer character and repeat decoder circuit 29 is provided to decode the coded first character of each three-character repeat sequence.

The detection in the storage buffer 23 of a coded new line character by the new line decoder circuit 25 causes an output signal to be produced thereby and to be applied to a logic circuit 32. The logic circuit 32, which typically includes flip-flop circuitry, operates in response to the output signal produced by the new line decoder circuit 25 to be set and to produce an output signal which is applied to a gate 34 and also to the address counter circuit 17. The address counter circuit 17 operates in response to the output signal produced by the logic circuit 32 to be inhibited whereby the count therein is prevented from being incremented to the next count. As a result, and while further processing of the coded new line character takes place, the random access memory 2 is prevented from reading out of the general storage section 10 additional characters following the detected coded new line character.

The gate 34, which may be a NOR logic gate, operates in response to the signal received thereby from the logic circuit 32 to produce and apply a corresponding control signal to a control input of an output multiplexer circuit 35. The output multiplexer circuit 35 is normally used to multiplex characters, other than memory conservation characters, to the output buffer circuit 18. However, in the case of the detection of the coded new line character under discussion, the presence of a control signal at the control input of the output multiplexer circuit 35 causes the output multiplexer circuit 35 to supply to the output buffer circuit 18 a special coded output character, namely, a coded space character (e.g., 01000000). The coded space character, in a parallel bit format, is buffered in the output buffer circuit 18 and then clocked repeatedly and continuously into the output serializer 19, by means of load clock pulses applied to the output serializer 19 at the character rate (141 Khz), until the time of occurrence of the next new line command signal. When the next new line command signal occurs, the logic circuit 32 is caused to be reset, thereby terminating the output signal therefrom and re-enabling the memory 2 and also terminating the output signal from the gate 34. As a result, the output multiplexer circuit 35 is once again enabled to multiplex the next character, if not another memory conservation character, to the output buffer circuit 18.

The processing of a coded spacer character received by and stored in the storage buffer 23 is initiated by the spacer decoder circuit 27. The detection in the storage buffer 23 of a coded spacer character by the spacer decoder circuit 27 causes an output signal to be produced thereby and to be applied to a gate 36 and also to a logic circuit 37. The gate 36, which may be a NOR logic gate, operates in response to the signal received thereby to produce and apply a load signal to a counter circuit 39. The counter circuit 39 is enabled by this load signal to receive and retain therein a count, as specified by particular bits of the spacer character and representing the number of times that spaces are to appear consecutively in a given display line of the video display monitor 4. Following the application of the aforesaid count to the counter circuit 39, an inhibit output signal is produced thereby and applied to the address counter circuit 17 and also to the storage buffer 23. This signal, like the output signal produced by the logic circuit 32, causes the address counter circuit 17 to be inhibited, while further processing of the coded spacer character takes place, from incrementing its count and causing the readout from the memory 2 of additional data characters. This signal also causes the storage buffer 23 to freeze the coded data character next following the coded spacer character while the further processing of the coded spacer character takes place.

The output signal produced by the spacer decoder circuit 27 and applied to the logic circuit 37 causes the logic circuit 37, which typically includes flip-flop circuitry, to be set and to produce an output signal which is applied to the gate 34. The gate 34, as before, operates to produce and apply a control signal to the control input of the output multiplexer circuit 35. As before, the output multiplexer circuit 35 operates to supply a coded space character to the output buffer circuit 18. The coded space character is buffered in the output buffer circuit 18 and then clocked repeatedly and continuously into the output serializer 19 at the character rate (141 Khz). The number of times that the coded space character is clocked into the output serializer 19 is determined by the count entered into the counter circuit 39 or, alternatively, by an output signal produced by the character counter 20. More particularly, after the count from the coded spacer character has been entered into the counter circuit 39, the count is successively reduced therein by means of successive clock pulses applied to the counter circuit 39 at the character rate (141 Khz). When the count in the counter circuit 39 reaches a predetermined value, specifically, a value of 0, an output signal is produced thereby and applied to the logic circuit 37 and, at the same time, the inhibit signal applied by the counter circuit 39 to the address counter circuit 17 and to the storage buffer 23 is terminated. The termination of the signal to the address counter circuit 17 re-enables the memory 2, in the manner earlier described, to permit readout of new characters therefrom and also re-enables, or releases, the storage buffer 23 to receive additional characters from the memory 2. The output signal applied to the logic circuit 37 by the counter circuit 39 causes it to be reset whereby the output signal therefrom is terminated and the output signal produced by the gate 34 is also terminated. The output multiplexer circuit 35 is accordingly again enabled to multiplex the next character, if not another memory conservation character, to the output buffer circuit 18. It is to be noted that, if before the counter circuit 39 has been caused to count down to 0, an output signal is produced by the character counter 20 signifying the end of a display line (80 characters), the counter circuit 39 is automatically and directly reset to a count of 0 by this output signal. As a result, the output signal produced by the counter circuit 39 and applied to the address counter circuit 17 and to the storage buffer 23 is terminated, thereby re-enabling the memory 2 and releasing the storage buffer 23, as before, and resetting the logic circuit 37, thereby terminating the control signal applied by the gate 34 to the control input of the output multiplexer circuit 35.

The processing of a coded three-character repeat sequence received by and stored, one character at a time, in the storage buffer 23 is initiated by the repeat decoder circuit 29. The detection in the storage buffer 23 os the coded first character of a three-character repeat sequence by the repeat decoder circuit 29 causes an output signal to be produced thereby and to be applied to a logic unit 41 and also to a three-stage shift register 42. The logic unit 41, which typically includes flip-flop circuitry, operates in response to the output signal produced by the repeat decoder circuit 29 to be set and to produced by the repeat decoder circuit 29 to be set and to produce an inhibit signal which is applied to the outuput buffer circuit 18. This inhibit serves servies to inhibit the output buffer circuit 18 from receiving therein the coded first and second characters of the three-character repeat sequence during the time of the processing of these characters. The shift register 42 operates in response to the inhibit signal produced by the repeat decoder circuit 29 to establish a bit, such as a "1" bit, in the first stage of the shift register 42. The three-stage register 42 also receives clock pulses, for example, at the data bit rate, typically 1.41 Mhz, which clock the "1 " bit into and along the stages of the shift register 42. The 1.41 Mhz to clock pulses may be derived from the aforementioned timing and control circuit 53 of FIG. 5. When the "1" bit reaches the second stage of the shift register 42, an output signal is produced by the register 42 and applied to the gate 36. The gate 36 operates in response to this signal to produce and apply a load signal to the counter circuit 39. This load signal causes the coded second character of the three-charcter repeat sequence, then present in the storage buffer 23 and representing the number of time that the repeat character (coded third character of the sequence) is to be repeated, to be loaded into the counter circuit 39. When the "1" bit in the shift register 42 is shifted from the second stage to the third stage, an output signal is produced by the shift register 42 and applied to the logic unit 41. The logic unit 41 operates in response to this signal to terminate the inhibit signal applied to the output buffer circuit 18 whereby the output buffer circuit 18 is prepared to receive, at the appropriate time, the character to be repeated, that is, the coded third character of the repeat sequence. Contemporaneous with the above operation, the counter circuit 39 operates to produce and apply an output signal to the address counter circuit 17 and to the storage buffer 23 to respectively inhibit the readout of additional characters from the memory 2, in the same manner as earlier described, and to freeze the character to be repeated in the storage buffer 23.

As in the case of the processing of a coded spacer character, the count applied to the counter circuit 39 during the processing of the coded three-character repeat sequence under discussion is caused to be reduced by means of the clock pulses applied in succession to the counter circuit 39 at the character rate. Each time that the count in the counter circuit 39 is reduced by one, the coded repeat character in the storage buffer 23 is multiplexed to the output buffer circuit 18 by the output multiplexer circuit 35. When the count in the counter circuit 39 has been clocked to 0, the inhibit signal produced thereby and applied to the address counter circuit 17 and to the buffer circuit 23 is terminated. In the event an output signal is produced by the character counter 20 before the counter circuit 39 has been clocked to a count of 0, the counter circuit 39 is automatically and directly reset to a count of 0. In any case, the termination of the inhibit signal produced by the counter circuit 39 re-enables the memory 2, in the manner earlier described, to permit the readout of additional characters from the memory 2, and releases the storage buffer 23 to receive another character from the memory 2.

As mentioned previously, words 0, 5, 6 and 7 of each table are applied to and stored in the storage arrangement 22. This information is processed in the following manner. As the cursor *y* word, which represents the number of a particular display line, is applied to and stored in the counter 22*a*, the counter 22*a* is caused to count downwardly from this number by means of the clock pulses applied to the counter 22*a* at the 1620 Hz rate. When the count in the counter 22*a* reaches 0, an output signal is produced by the counter 22*a* and applied to a logic circuit 47 and, at the same time, the cursor *x* counter 22*d*, which receives and stores the cursor *x* word representing the number of a particular character position in a line, is caused to count downwardly, by means of the clock pulses at the character rate (141 Khz). When the count in the cursor *x* counter 22*d* reaches 0, an output signal is produced thereby and applied to the logic circuit 47. The logic circuit 47, which typically includes standard logic components such as flip-flop circuitry and gates, also receives a signal, specifically, a bit (bit 4) from the control word 6 specifying the particular type of cursor, that is, a "1" bit for an inverted type cursor or a "0" bit for an underline type cursor. The logic circuit 47 operates in response to the signals received thereby from the counters 22*a* and 22*d* and from the buffer 22*c* to produce two output bits, one specifying a cursor operation, for example, a "1" bit, and the other specifying the type of cursor, for example, a "0" bit for an underline type cursor or a "1" bit for an inverter type cursor. The two output bits of the logic circuit 47 are applied to the output buffer circuit 18 and added therein to the character then present in the output buffer circuit 18.

Specific bits stored in the buffer 22*c*, namely, bits 5, 6 and 7 of control word 6 are utilized either by the aforedescribed gate 34 or by the spacer decoder circuit 27 and the repeat decoder circuit 29. Bit 5 of the control word 6, when a "0", indicates that a transmission is to occur to a device associated with the video display monitor 4 and causes the spacer decoder circuit 27 and the repeat decoder circuit 29 to be inhibited from performing their respective decoding operations. As a result, the coded data characters received by the storage buffer 23 are permitted to be applied by the spacer decoder circuit 27 and the repeat decoder circuit 29. The characters are applied to the output buffer circuit 18 until a new table is read out from the memory 2 and applied to and stored in the storage arrangement 22.

Bit 6 of word 6, when having a binary value of "0", indicating that the table stored in the storage arrangement 22 is the last table, causes the gate 34 to produce and apply a control signal to the output multiplexer circuit 35 to again cause coded space characters to be applied by the output multiplexer circuit 35 to the output buffer circuit 18. These coded space characters are applied to the output buffer circuit 18 until the occurrence of the next vertical sync specifying the beginning of a new frame. This vertical sync signal causes the next readout of the first table, that is, table 0, from the memory 2 and the application of words 0, 5, 6 and 7 of this table to the storage arrangement 22. Bit 6 is also applied to the table counter circuit 15 and prevents the table counter circuit 15 from incrementing its count and, therefore, its table address, to the next table address. As a result, information which might otherwise be construed by the apparatus of the invention as new table information is prevented from being read out from the memory 2.

Bit 7 of word 6, when having a binary value of "0" indicating a "display off" condition in which display data is concealed from the user of the video display terminal 4, causes the gate 34 to produce and apply a control signal to the output multiplexer circuit 35 to once again cause coded space characters to be produced and applied by the output multiplexer circuit 35 to the output buffer circuit 18 as a result of which spaces are established on the video display monitor 4. These coded space characters are applied to the output buffer circuit 18 until words 0, 5, 6 and 7 of the next table having a "1" "display on" bit 7 in control word 6 are applied to and stored in the storage arrangement 22.

The window size word (word 5) of each table stored in the storage arrangement 22, specifying a number of lines of data to be read out from the memory 2 to be displayed on the display surface of the video display monitor 4, is used to initiate the readout from the memory 2 of the next table. Specifically, when the window size word has been applied to and stored in the window size counter **22*b*, the counter 22*b* is caused to count downwardly from the number or count specified by the window size word by means of the clock pulses applied to the counter 2 at the 1620 Hz rate. When the count in the counter 22*b* reaches 0, the time of occurrence of which is dependent on the initial count applied to the counter 22*b*, an end-of-window output signal is produced thereby and applied to the table counter circuit 15. This end-of-window output signal causes the table counter circuit 15 to increment its count and, therefore, its table address, by one whereby the next table is caused to be read out, via the multiplexer steering circuit 7 (FIG. 1), from the memory 2.**

Each coded character applied to the output buffer circuit 18 is loaded into the output serializer 19, at the character rate (141 Khz) and converted from a parallel bit format to a serial bit format by means of unload clock pulses applied to the output serializer 19 at the data bit rate, that is, 1.41 Mhz. In addition, coded synchronization characters, specifically, coded line and frame synchronization characters, are periodically inserted into the output data stream from the output serializer 19 for use by the processing circuitry 12, as described in detail in the aforementioned copending application of Williams. Each of the coded synchronization characters, typically comprising 15 bits, may be supplied to the output serializer 19 by any suitable means, for example, by the timing and control circuit 53 of FIG. 5 The output data from the output serializer 19 is applied to a line receiver/transmitter 50 and transmitted over a suitable transmission line, such as a coaxial cable 51, to the processing circuitry 12 which, as described in the aforementioned application of Williams, includes recirculating data registers, character generator circuitry, synchronization detection circuitry and other related circuitry for processing the output data from the output serializer 19. A typical length for the coaxial cable 51 is 2,000 feet. The line receiver/transmitter 50 is also capable of receiving data from devices associated with the video display monitor 4 (for example, keyboard-entered data) and transmitting this data to an external processor for processing by the processor. By way of example, for a frame of data comprising typically 27 intervals, the line receiver/transmitter 50 may be placed in a transmit mode during intervals 1 and 3–27 and in a receive mode during interval 2. The bi-directional control of the line receiver/transmitter 50 may be achieved by means of transmit and receive control signals produced by the aforementioned timing and control circuit 53 of FIG. 5.

Referring now to FIG. 5, there is shown the aforementioned timing and control circuit 53 which may be used to produce timing and control signals for use by the data storage and processing apparatus of the invention. The control circuit 53 includes a basic clock source 54 which operates to produce output clock pulses at a rate of 11.34 Mhz, the dot rate of the video display monitor 4. These clock pulses are divided by 8 by a divide-by-eight counter 52 to produce output clock pulses at the data bit rate, that is, 1.41 Mhz. The output clock pulses produced by the counter 52 are then divided by 10 by a divide-by-ten counter 57 to produce output clock pulses at the character rate, that is, 141 Khz. These clock pulses are then divided by 87.5 by a divide-by-87.5 counter 59 to produce output clock pulses at the 1620 hertz rate. Each count of 87.5 produced by the counter 59 is decoded by a decoder 60 to produce a new line command signal.

The output clock pulses produced by the counter 59 are divided by 27 a divide-by-twenty seven counter 62 to produce out put clock pulses at the 60 hertz rate. Each count of 2 produced by the counter 62 is decoded by a decoder circuit 63 to produce a receive control signal for operating the line receiving/transmitter 50 in its receive mode. In the absence of the decoding of the 2 count by the decoder circuit 63, the decoder circuit 63 produces a transmit control signal for operating the line receiving/transmitter in its transmit mode. Each count of twenty seven produced by the counter 62 is decoded by a decoder 64 to produce a vertical sync signal. Decodes from the counters 59 and 62 are also employed to derive the aforementioned coded line and frame synchronization characters. More particularly, at each count of 86 of the counter 59, except if there is a contemporaneous 27 count of the counter 62, a coded line synchronization character is produced by a decoding and logic circuit 66. If the counter 59 produces an 86 count contemporaneously with a 27 count produced by the counter 62, a coded frame synchronization character is produced by the decoding and logic circuit 66.

MODIFICATIONS

While there has been described what is considered a preferred embodiment of the invention, it will be apparent to those skilled in the art that various changes and modifications may be made therein. For example, if the number of tables stored in the memory 2 is to be fixed, the table counter circuit 15 may be arranged to count only up to this number, in which case it is unnecessary to have last table information (bit 6 of word 6) in the tables. In addition, it is possible to modify the table counter circuit 15 to operate to cause the readout from the memory 2 of only a single (any) table. Other changes and modifications will be apparent to those skilled in the art without departing from the invention as recited in the appended claims.

What is claimed is:

1. Data storage and processing apparatus comprising:

storage means having a first section, a plurality of second sections and an output, said first section containing data characters at predetermined successive storage locations therein specified by corresponding addresses and said plurality of second sections each containing a table of information therein, each of the tables of information including start address information specifying the address of the storage location of a particular data character in the first storage section of the storage means and block size information specifying a particular size of a block of data characters, commencing with the data character at the storage location in the first section of the storage means specified by the start address information, to be read out from the first section of the storage means;

first means coupled to the storage means and operative to cause a table of information contained in a second section of the storage means to be read out therefrom and applied to the output of the storage means;

second means coupled to the storage means and operative after the table of information has been read out from its second section of the storage means to receive the start address information of the table of information, and operative in response to the start address information to cause the storage means to read out to its output data characters from the first section thereof commencing with the data character at the storage location in the first section specified by the start address information; and third means coupled to the output of the storage means and operative after the table of information has been read out from its second section of the storage means to receive the block size information of the table of information, and operative after a period of time related to the size of the block of data characters specified by the block size information to cause the second means to discontinue the readout from the first section of the storage means of the data characters following the initial data character read out from the storage means in the location in the first section specified by the start address information of the table information.

2. Data storage and processing apparatus in accordance with claim 1 wherein:

the storage means further has an address input; and the second means is operative in response to the start address information of the table of information to couple the start address information to the address input of the storage means;

said storage means being responsive to the start address information received at its address input to read out to its output the data characters from the first section thereof commencing with the data character at the storage location specified by the start address information.

3. Data storage and processing apparatus in accordance with claim 2 wherein:

the second means and the third means each include a counter circuit.

4. Data storage and processing apparatus in accordance with claim 3 wherein:

the storage means includes a random access memory.

5. Data storage and processing apparatus comprising:

storage means having a first section, a plurality of second sections and an output, said first section containing data characters at predetermined successive storage locations therein specified by corresponding addresses and said plurality of second sections each containing a table of information, each of the plurality of tables of information including start address information specifying the address of the storage location of a particular data character in the first storage section of the storage means and block size information specifying a particular size of a block of data characters, commencing with the data character at the storage location in the first section of the storage means specified by the start address information, to be read out from the first section of the storage means;

first means coupled to the storage means and operative to cause the plurality of tables of information contained in the second sections of the storage means to be read out therefrom in a predetermined sequence and applied to the output of the storage means;

second means coupled to the storage means and operative after each table of information has been read out from its second section of the storage means to receive the start address information of the table of information, and operative in response to the start address information to cause the storage means to read out in succession to its output data characters from the first section thereof commencing with the data character at the storage location in the first section specified by the start address information; and third means coupled to the storage means and to the first means and operative after each table of information has been read out from its second section of the storage means to receive the block size information of the table of information, and operative after a period of time related to the size of the block of data characters specified by the block size information to cause the first means to initiate the readout of another table of information from a second section of the storage means whereby the second means discontinues the readout from the first section of the storage means of the data characters following the initial data character read out from the storage means in the location in the first section specified by the start address information of the associated table of information.

6. Data storage and processing apparatus in accordance with claim 5 wherein:

the first means is operative to cause the plurality of tables of information contained in the second sections of the storage means to be read out therefrom to the output of the storage means in succession.

7. Data storage and processing apparatus in accordance with claim 6 wherein:

the last table of information of the plurality of tables of information stored in the second sections of the storage means further includes last-table information indicating that the table of information is the last table of information; and said data storage and processing apparatus further comprising:

fourth means couple to the output of the storage means and to the first means and operative after the last table of information has been read out from the corresponding second section of the storage means to receive the last-table information therein, and operative in response to the last-table information to prevent the first means from the readout of additional dat characters from the storage means.

8. Data storage and processing apparatus in accordance with claim 5 wherein:

the storage means further has an address input; and the second means is operative to couple the start address information of each table of information to the address input of the storage means;

said storage means being operative in response to the start address information of each table of information received at its address input to read out to its output the data characters from the first section thereof commencing with the data character at the storage location specified by the start address information.

9. Data storge and processing apparatus in accordance with claim 8 wherein:

the start address information of each table of information represents a count specifying the address of a storage location in the first section of the storage means, and the block size information of each table of information represents a count specifying a particular number of lines of data characters to be read out from the first section of the storage means;

the second means includes an address counter circuit means for receiving and coupling the count represented by the start address information of each table of information to the address input of the storage means;

the third means includes a block size counter circuit means for receiving and retaining the count represented by the block size information of each of information, and means operative to reduce the count retained in the block size counter circuit means to a predetermined value, said block size counter circuit means being operative when the count therein has been reduced to the predetermined value to produce an output signal;

the fourth means includes circuit means for receiving the last-table information of the table of information and operative in response thereto to produce an output signal; and said first means includes a first input for receiving each output signal produced by the block size counter circuit means and a second input for receiving each output signal produced by the circuit means of the fourth means, said first means being operative in response to an output signal received at its first input produced by the block size counter circuit means and in the absence at its second input of an output signal produced by the circuit means of the fourth means to cause the next table of information to be read out from the second section of the storage means, and being operative in response to an output signal at its second input produced by the circuit means of the fourth means to be inhibited from causing the readout of additional data characters from the storage means.

10. Data storage and processing apparatus in accordance with claim 9 wherein:

the first means includes a table counter circuit means;

and the circuit means of the fourth means includes a buffer circuit means.

* * * * *